Jan. 22, 1946. G. P. BOSOMWORTH ET AL 2,393,503
MULTIPLE PRESSURE RESPONSIVE DEVICE
Filed Feb. 24, 1944 5 Sheets-Sheet 1

Inventor
GEORGE P. BOSOMWORTH
AND
DUNCAN C. MILNER

By Ely & Frye
Attorneys

Jan. 22, 1946.   G. P. BOSOMWORTH ET AL   2,393,503
MULTIPLE PRESSURE RESPONSIVE DEVICE
Filed Feb. 24, 1944   5 Sheets-Sheet 2

Inventor
GEORGE P. BOSOMWORTH
AND
DUNCAN C. MILNER

By Elyo Frye

Attorneys

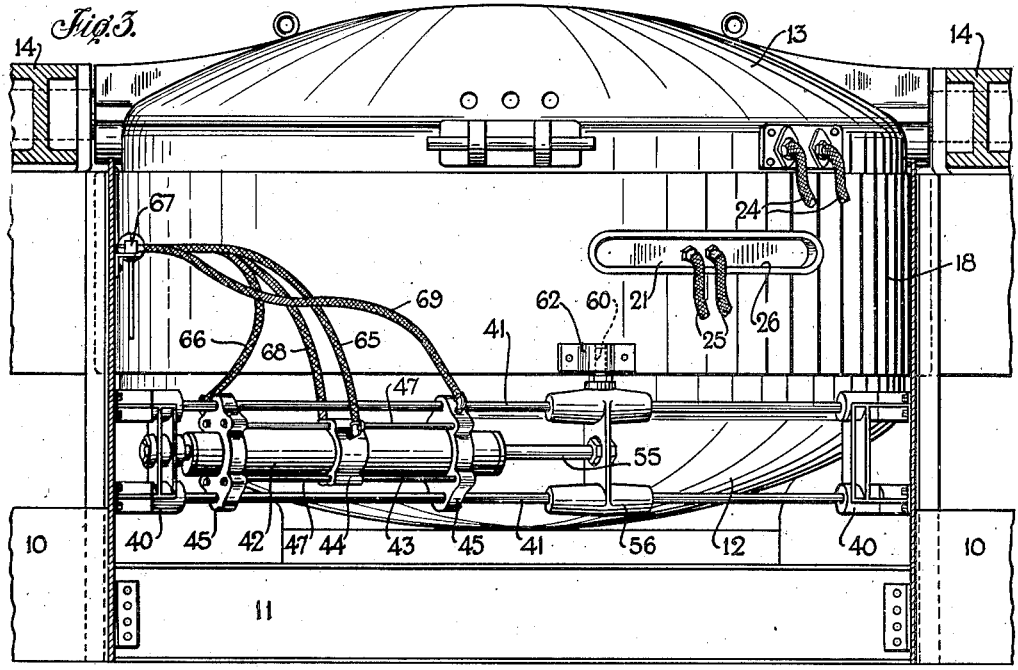
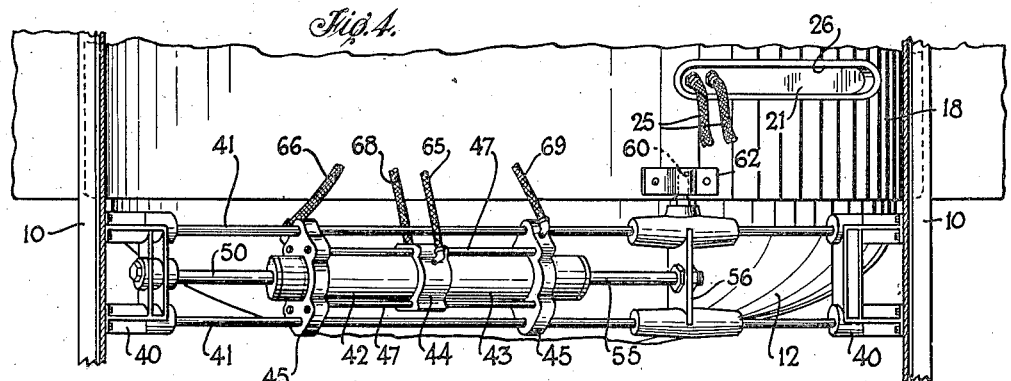
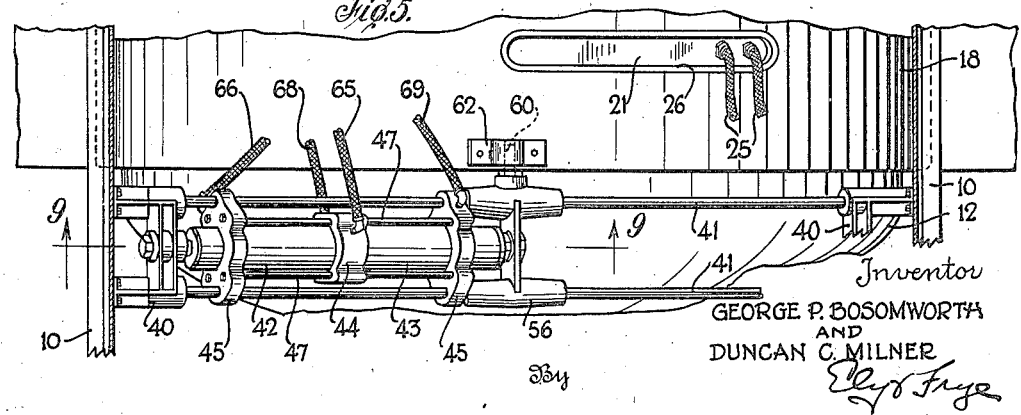
Inventor
GEORGE P. BOSOMWORTH
AND
DUNCAN C. MILNER

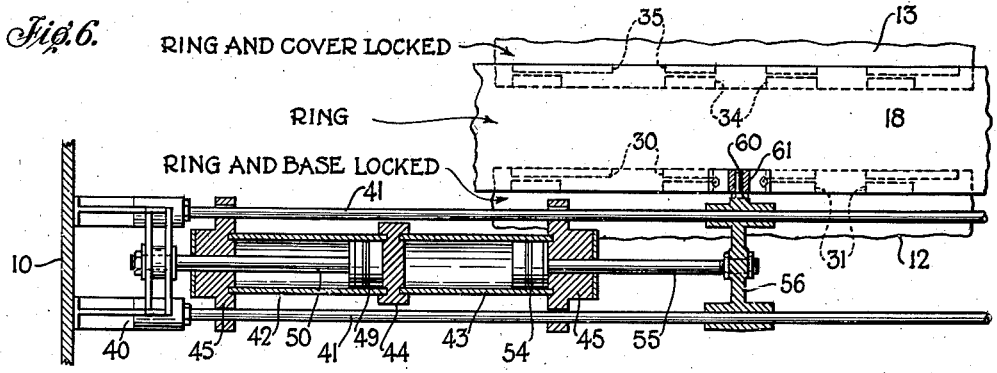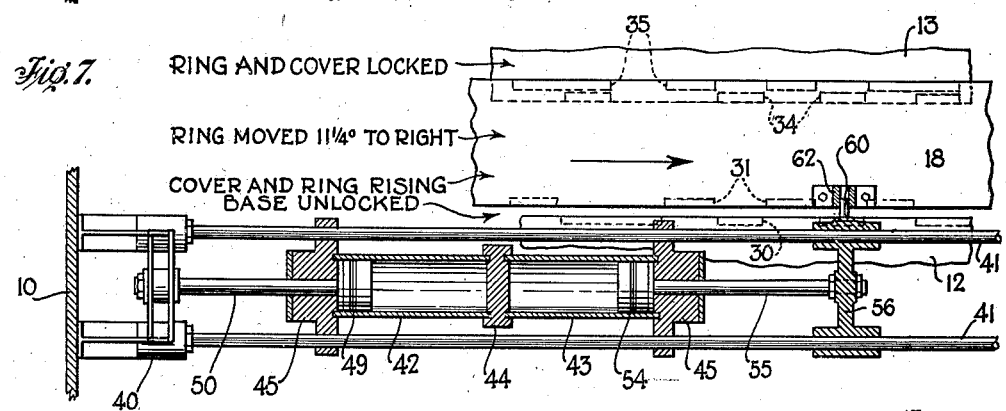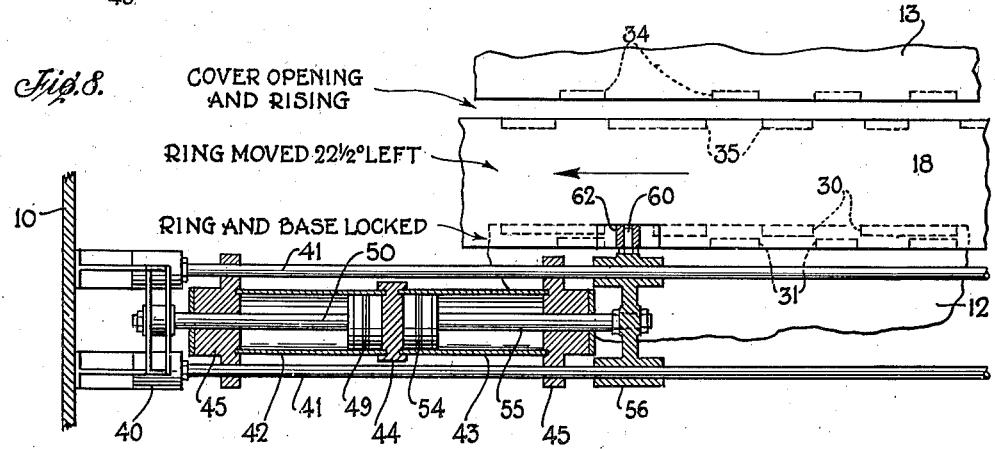

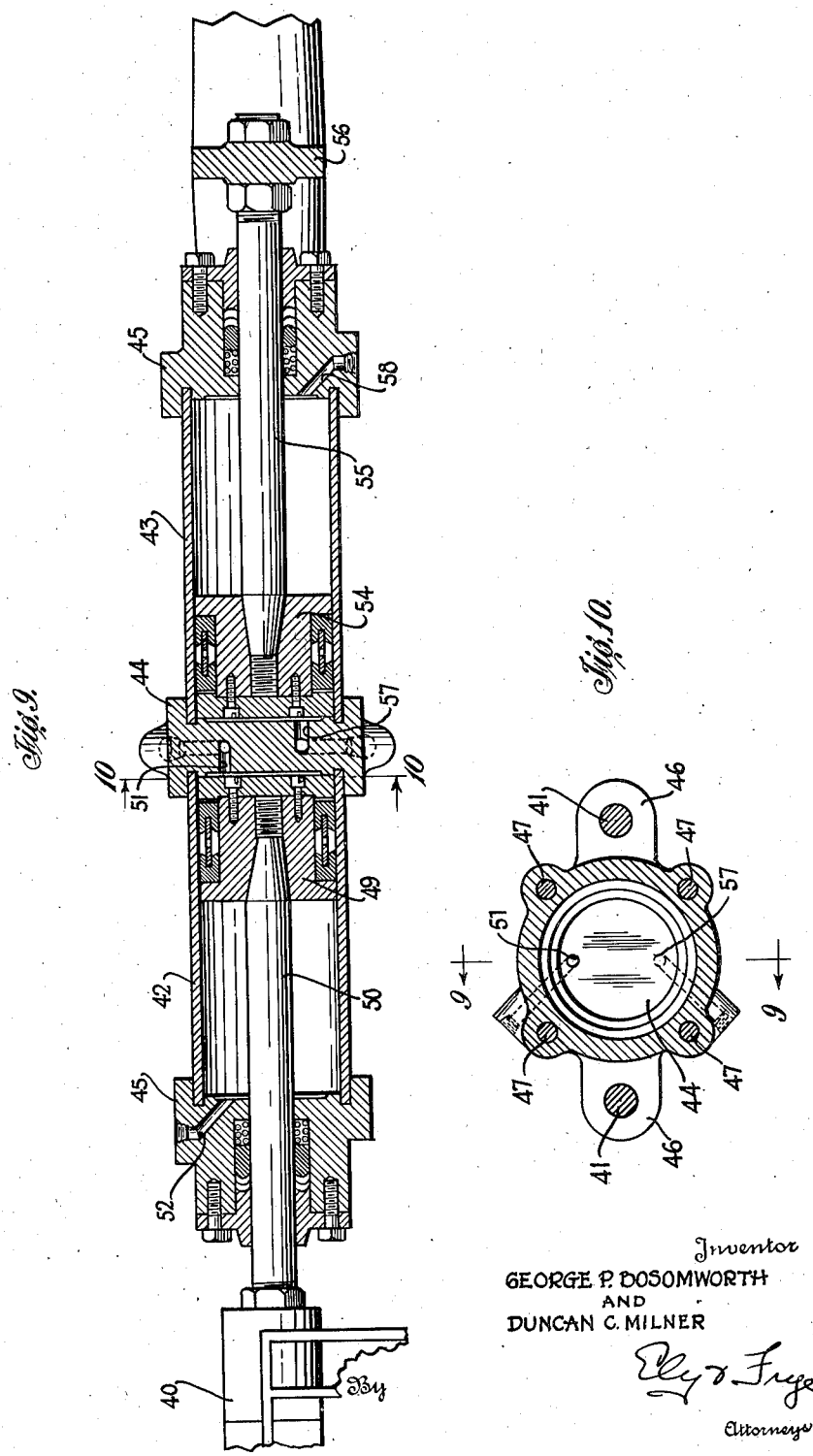

Patented Jan. 22, 1946

2,393,503

UNITED STATES PATENT OFFICE 2,393,503

MULTIPLE PRESSURE RESPONSIVE DEVICE

George P. Bosomworth, Akron, and Duncan C. Milner, Barberton, Ohio, assignors to The Firestone Tire & Rubber Company, Akron, Ohio, a corporation of Ohio Application February 24, 1944, Serial No. 523,752

2 Claims. (Cl. 18—17)

This invention relates to multiple pressure responsive devices, and more especially it relates to a dual fluid pressure operated device having two pressure impelled elements so constructed and arranged as to impart motion to a single instrumentality, said elements being operable singly or concurrently to move said instrumentality selectively to any one of three determinate positions.

The invention is of general utility for the purpose mentioned. It has been found especially useful in the rubber industry in combination with tire or tube vulcanizing apparatus wherein a dual, three-section mold is enclosed within the vulcanizer, the latter being provided with a rotatable locking ring having three operative positions. In one of said positions the vulcanizer is locked in closed condition. In the other positions of the locking ring the vulcanizer is unlocked, and one of the mold sections is so engaged that either cavity of the dual mold therein may be exposed, selectively, upon opening of the vulcanizer. Such a vulcanizing apparatus constitutes the subject matter of U. S. Patent No. 2,339,553, issued January 18, 1944, to George P. Bosomworth and Edward S. Heck. An illustrative embodiment of the invention is depicted and described herein in operative association with the vulcanizing apparatus of said patent.

The chief object of the invention is to provide a relatively simple and easily operated power device for moving an instrumentality selectively to any one of three determined positions. More specifically the invention aims to provide a pressure-responsive device capable of oscillating a rotary member to any one of three determinate angular positions; and to provide ready disengagement of the pressure-responsive device and the rotary member which it is adapted to oscillate. Other objects will be manifest as the description proceeds.

Of the accompanying drawings:

Fig. 3 is a rear elevation of the structure shown in Fig. 1 with parts broken away for clarity of illustration, the pressure responsive device being shown in one of its alternative positions of operation;

Fig. 4 is a fragmentary view of the structure shown in Fig. 3, the pressure responsive device being shown in another alternative position of operation;

Fig. 5 is a view of the structure shown in Fig. 4, the pressure responsive device being shown in the third of its alternative positions of operation;

Figure 1:
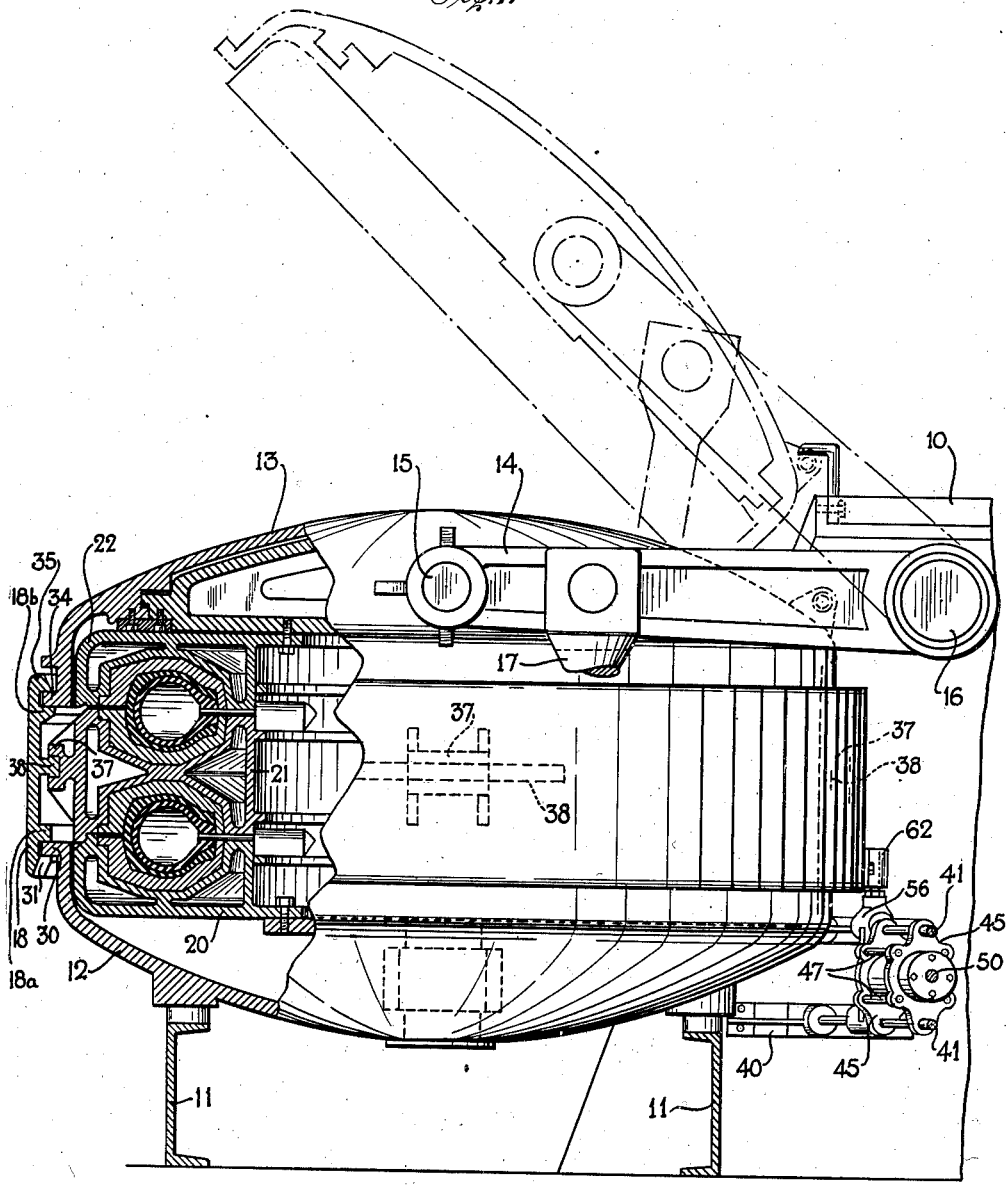
Fig. 1 is a side elevation of vulcanizing apparatus, with parts broken away and in section, and a pressure responsive device embodying the invention operatively associated therewith, a part of the latter being broken away.

Figs. 6, 7, and 8 are somewhat diagrammatic views showing the locking ring of the vulcanizing apparatus in its three different operative positions, and the pressure responsive device operatively connected thereto, said device being shown in section;

Fig. 9 is a longitudinal section of the pressure responsive device taken on the line 9—9 of Figs. 5 and 10; and Fig. 10 is a section on the line 10—10 of Fig. 9.

Referring to the drawings, there is shown a vulcanizing apparatus that is essentially similar to the apparatus of the aforementioned Bosomworth et al. patent. Said apparatus comprises a framework 10 that includes a stationary support 11, a stationary lower vulcanizer section 12 mounted upon said support 11, a movable upper vulcanizer section or cover 13, and a pair of arms 14, 14 for raising and lowering the cover 13 between the position shown in full lines in Fig. 1, and the position shown in broken lines therein. The arms 14 are pivotally connected to the cover 13 at diametrically opposite points 15 and are pivotally supported on the housing 10 at 16, there being power-operated piston rods 17 for swinging the said arms in the usual manner. The vulcanizer sections are of concavo-convex shape and have their concave sides in confronting relation to define a chamber for vulcanizing molds. The confronting margins of the sections 12, 13 do not meet in the closed condition of the vulcanizer, but are considerably spaced apart as shown, and an annular locking ring 18 is provided for spanning the space between the sections, and for locking the same to each other in the closed position of the vulcanizer.

Mounted interiorly of the vulcanizer is a pair of horizontally arranged molds comprising a lower mold section 20, an intermediate mold section 21, and an upper mold section 22, the latter being secured to the vulcanizer cover 13. As shown, the lower mold section 20 is fixedly attached to the stationary vulcanizer section 12, but other known means of mounting this mold section may be employed if desired. The molds illustrated are for the vulcanization of pneumatic tire casings, but three-part dual molds for other purposes may be employed if desired. The mold sections 20, 21, 22 are steam jacketed for the purpose of applying heat to the articles therein. Steam is conducted to and from upper mold section 22 through flexible conduits 24, 24, Fig. 3, that extend through suitable bores in the vulcanizer cover 13. Steam is conducted to and from intermediate mold section 21 by suitable flexible conduits 25, 25, Figs. 3, 4, and 5, that extend through a circumferentially disposed slot 26 in the locking ring 18. Other conduits (not shown) extend through stationary vulcanizer section 12 for supplying steam to lower mold section 20.

The mold sections 20, 21 and 22 are closed when the vulcanizer is closed, that is, when the cover 13 is in lowered position, the locking ring 18 being employed to maintain the vulcanizer and molds tightly in closed position. In the opening of the vulcanizer and molds to remove finished work therefrom, the upper mold section 22 is lifted from the intermediate mold section 21 to enable removal of the work from the upper mold. To remove the work from the lower mold, upper mold section 22 and intermediate mold section 21 are lifted as a unit from mold section 20 to expose the work in the latter. In the latter instance the locking ring 18 is arranged to rise with the cover 13, and means is provided for effecting an interlock of the locking ring and intermediate mold section whereby both may rise with the upper mold section and cover. When the upper mold is opened the locking ring is not elevated, but remains in the position in which it locks the intermediate section to the lower vulcanizer section, thus maintaining the lower mold in closed condition.

In the closed condition of the vulcanizer the locking ring 18 rests upon the lower vulcanizer section 12, and to this end the locking ring is formed, adjacent its lower margin, with an inwardly extending circumferential flange 18a adapted to overlie a circumferential series of locking lugs formed on the upper margin of the vulcanizer section 12 and projecting outwardly therefrom, said lugs being designated as a whole by the numeral 30. For cooperation with the lugs 30 to effect a bayonet locking connection between the lower vulcanizer section and the locking ring, the lower margin of the latter is formed with a circumferential series of inwardly projecting lugs that are designated as a whole by the numeral 31.

In like manner the locking ring 18 is formed adjacent its upper margin with an inwardly extending circumferential flange 18b that may constitute a rest for the cover 13 of the vulcanizer in the lowered position of said cover, the latter having its lower margins formed with a circumferential series of radially outwardly projecting locking lugs, designated as a whole by the numeral 34, that may rest on said flange 18b. For cooperation with the lugs 34 to effect a bayonet locking connection between the cover 13 and locking ring 18, the upper margin of the latter is formed with a circumferential series of inwardly projecting lugs that are designated as a whole by the numeral 35. The size, shape, and arrangement of the locking lugs 30, 31 and 34, 35 is not an essential part of the present invention and need not be more fully described herein, attention being directed to the aforementioned patent of Bosomworth et al. for a detailed description thereof.

For effecting an interlock of the locking ring 18 and the intermediate mold section 21 the latter has its perimeter formed with a circumferential series of longitudinally slotted radially outwardly projecting ears 37, 37, and receivable in the slots thereof are respective circumferentially extending ribs or tongues 38 that are formed on the locking ring 18, intermediate the upper and lower margins thereof, and which extend radially inwardly of said locking ring. As is shown in Fig. 1 each tongue 38 is somewhat more than twice as long as its companion ear 37, and normally is disposed within the slot in said ear at all times.

The arrangement of the interlocking elements on vulcanizer sections and locking ring is such that in one angular position of the locking ring 18 the lugs 31, 35 thereon will be interlocked with the lugs 30, 34 respectively of the lower vulcanizer section 12 and cover 13 whereby the vulcanizer is locked in closed condition. This arrangement of the structure is most clearly shown in Fig. 6. In Fig. 7 is shown the relative positions of said locking elements when the locking ring 18 is moved 11¼° to the right, in which position the lugs 30, 31 are disengaged from each other to enable the cover 13 and ring 18 to rise as a unit to open the vulcanizer and the lower mold unit therein. In Fig. 8 is shown the relative positions of the locking elements when the locking ring 18 is moved 22½° to the left of the position shown in Fig. 7, or 11¼° to the left of the position shown in Fig. 6, the lugs 34, 35 being disengaged from each other and lugs 30, 31 being engaged whereby the cover 13 is enabled to rise without the locking ring and thereby to open the upper mold unit in the vulcanizer. Thus it will be apparent that the locking ring has three determinate angular positions of operation. The means for imparting limited determinate rotary movement to the locking ring 18, to achieve the operative functions set forth, constitutes the novel subject matter of the present invention.

Mounted upon the framework 10, at opposite sides of the vulcanizer, are respective brackets 40 that support a pair of parallel rods 41, 41 that are disposed in the same vertical plane, and are located a little below the locking ring 18, and rearwardly thereof. Supported upon the parallel rods 41 is a multiple fluid pressure responsive device that is shown in detail in Figs. 9 and 10. As shown in said figures, said pressure responsive device comprises two fluid pressure operated cylinders 42, 43, which cylinders are disposed in axial alignment, the adjacent confronting ends of the cylinders being separated by and secured to a cylinder head 44 that is common to both. The remote ends of the cylinders 42, 43 are closed by respective cylinder heads 45 that are of identical construction, each being formed at diametrically opposite sides with radially projecting ears 46, 46, said ears being apertured so as slidingly to receive the parallel rods 41. Tie rods 47, 47 connect the cylinder heads 45 and extend through the middle cylinder head 44 to reinforce the structure and retain the parts thereof in assembled relation. The arrangement is such that the dual fluid pressure device may move axially as a unit along the parallel rods 41.

Slidably mounted within cylinder 42 is the usual piston 49 having a piston rod 50 that extends through the adjacent cylinder head 45, the outer end of said piston rod being secured to the adjacent bracket 40. The cylinder 42 is double acting, pressure fluid being received and discharged at one end thereof through a port 51 formed in the middle cylinder head 44, and received and discharged at the other end thereof through a port 52 formed in its cylinder head 45. Since the piston rod 50 is connected to a stationary bracket 40, it will be apparent that the alternate charging of opposite ends of the cylinder 42 will move the dual fluid pressure device, including cylinder 43, back and forth along rods 41 between two determinate positions. Said device is shown in one of its alternative positions in Figs. 3 and 5, and in its other alternative position in Fig. 4.

Slidably mounted within cylinder 43 is a piston 54 having a piston rod 55 that extends through cylinder head 45 on the end of said cylinder, and has its outer end connected to a cross-head 56 that is slidably mounted upon the parallel rods 41 for reciprocatory movement therealong. The cylinder 43 also is double acting, pressure fluid being received and discharged at one end thereof through a port 57 formed in the middle cylinder head 44, and received and discharged at the other end thereof through a port 58 formed in its cylinder head 45. As shown in the drawings the cylinder 42 is the same length as the cylinder 43. Consequently the extent of movement of the device as a whole, including cylinder 43, under impetus of cylinder 42, is the same as the extent of movement of the crosshead 56 under impetus of the cylinder 43. Thus by selective actuation of cylinders 42, 43, the crosshead 56 may be moved to three different positions as is clearly shown in Figs. 3 to 5 and Figs. 6 to 8, which positions are spaced equi-distant from each other. It will be apparent that by providing cylinders 42, 43 of different lengths the distances between the three positions of the crosshead 56 may be made to differ from each other if desired.

Figure 2:
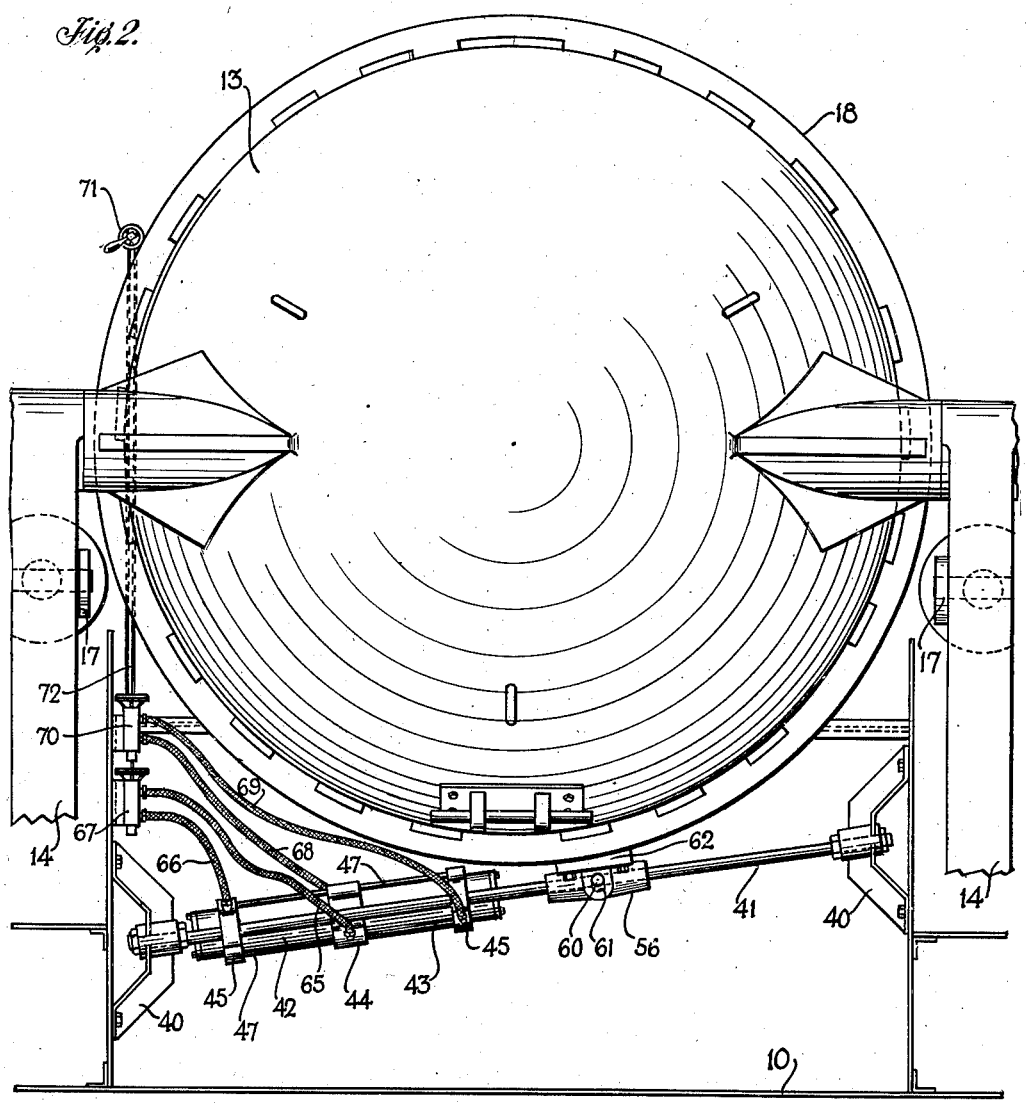
Fig. 2 is a plan view of the apparatus shown in Fig. 1.

Movement of the crosshead 56 as described is utilized to oscillate the rotatable locking ring 18 to lock the vulcanizing apparatus or to unlock the same in a manner that enables it to be opened with concurrent opening of the upper or the lower mold unit therein. To this end the crosshead is provided with an upstanding pin or stud 60 that is receivable in a slot 61 formed in a bracket 62, the latter being secured to the perimeter of the locking ring 18. As shown in Fig. 2, the slot 61 is disposed radially of the locking ring 18 so that the latter may turn on its axis under the impetus of the stud 60, movement of the latter being rectilinear and parallel to a tangent to said locking ring. When the locking ring rises with the cover 13 during the opening of the vulcanizer as in Fig. 7, the bracket 62 separates from the stud 60, but re-engages the same when the locking ring and cover again are lowered to close the vulcanizer.

From the foregoing it will be apparent that the pressure responsive device of the invention coordinates the operation of two fluid pressure operated cylinders to impart limited rotary movement to a single instrumentality (the locking ring 18) whereby the latter is selectively moved to any of three determinate angular positions. Viewed from a different angle, the invention comprises a fluid pressure cylinder for oscillating a single instrumentality, and a second fluid pressure cylinder for moving the first mentioned cylinder longitudinally to either of two determinate positions. The positions of said cylinders with relation to the locking ring 18, in the three angular positions of the latter, are best shown in Figs. 6 to 8, which figures also show the relative positions of the pistons of the cylinders for each angular position of the locking ring.

A part of the piping and control mechanism of the pressure responsive device is shown in Fig. 2. As shown in said figure, pressure fluid is supplied to and vented from opposite ends of cylinder 42, through ports 51, 52 thereof, by flexible conduits 65, 66 respectively that extend to a four-way hydraulic valve 67. In like manner pressure fluid is supplied to and vented from opposite ends of the cylinder 43, through ports 57, 58 thereof, by flexible conduits 68, 69 respectively that extend to a four-way hydraulic valve 70. As shown, the valves 67 and 70 are pneumatically operated by a manually controlled pilot valve 71 connected to said valves by piping shown at 72, but other means may be provided for operating said valves if desired.

The invention is simple in construction, efficient and accurate in operation, and achieves the other advantages set out in the foregoing statement of objects.

Modification may be resorted to without departing from the spirit of the invention or the scope thereof as defined by the appended claims.

What is claimed is:

1. In apparatus of the character described the combination of a vulcanizer including a rotary annular locking ring having three determinate operative positions, supporting rods disposed substantially tangentially of said locking ring, a double-acting fluid pressure operated cylinder slidably mounted upon said rods for movement longitudinally thereof parallel to its own axis, fluid pressure operated means for so moving said cylinder alternatively to one of a plurality of determinate positions along said rods, a crosshead slidably carried by said rods and connected to the piston rod of said cylinder, an upstanding stud on said crosshead, and a bracket secured to the perimeter of the locking ring and formed with a slot disposed radially of the locking ring in which slot the stud is receivable in the closed condition of the vulcanizer to constitute a driving connection, said bracket being separable from the stud when the locking ring rises during opening of the vulcanizer.

2. In apparatus of the character described the combination of a vulcanizer including a rotary annular locking ring therefor having three determinate operative positions, a member having rectilinear movement parallel to a tangent to said locking ring, power means moving said member from one to another of said determinate positions, and operatively inter-engaging elements on said locking ring and said member, one of said inter-engaging elements being a stud and the other being a slotted bracket and constituting a driving connection therebetween when said vulcanizer is closed, permitting relative transverse motion between said rotary locking ring and said member having rectilinear movement.

GEORGE P. BOSOMWORTH.
DUNCAN C. MILNER.